(12) United States Patent
Krämer et al.

(10) Patent No.: US 10,988,693 B2
(45) Date of Patent: Apr. 27, 2021

(54) MICA COATED WITH METAL OXIDE AS A FLAME RETARDANT

(71) Applicant: BASF SE, Ludwigshafen (DE)

(72) Inventors: Roland Helmut Krämer, Mannheim (DE); Peter Deglmann, Mannheim (DE); Aron Wosylus, Bad Duerkheim (DE); Sebastian Wagner, Ludwigshafen (DE); Sung Yeun Choi, Ludwigshafen (DE); Michael Roth, Lautertal (DE); Klaus Uske, Bad Duerkheim (DE)

(73) Assignee: BASF SE, Ludwigshafen (DE)

( * ) Notice: Subject to any disclaimer, the term of this patent is extended or adjusted under 35 U.S.C. 154(b) by 20 days.

(21) Appl. No.: 15/533,522

(22) PCT Filed: Dec. 14, 2015

(86) PCT No.: PCT/EP2015/079552
§ 371 (c)(1),
(2) Date: Jun. 6, 2017

(87) PCT Pub. No.: WO2016/096696
PCT Pub. Date: Jun. 23, 2016

(65) Prior Publication Data
US 2018/0282627 A1 Oct. 4, 2018

(30) Foreign Application Priority Data
Dec. 15, 2014 (EP) .................................. 14197853

(51) Int. Cl.
| C08K 9/02 | (2006.01) |
|---|---|
| C09K 21/02 | (2006.01) |
| C08K 3/10 | (2018.01) |
| C08K 3/016 | (2018.01) |
| C08K 3/34 | (2006.01) |
| C08K 3/02 | (2006.01) |
| C08K 7/14 | (2006.01) |
| C08K 5/00 | (2006.01) |
| C08K 5/5313 | (2006.01) |
| C08K 5/3492 | (2006.01) |
| C08L 67/02 | (2006.01) |
| C08K 3/22 | (2006.01) |
| C08L 77/06 | (2006.01) |
| C01B 33/42 | (2006.01) |

(52) U.S. Cl.
CPC .............. *C09K 21/02* (2013.01); *C08K 3/016* (2018.01); *C08K 3/02* (2013.01); *C08K 3/10* (2013.01); *C08K 3/22* (2013.01); *C08K 3/34* (2013.01); *C08K 5/0066* (2013.01); *C08K 5/34928* (2013.01); *C08K 5/5313* (2013.01); *C08K 7/14* (2013.01); *C08K 9/02* (2013.01); *C08L 67/02* (2013.01); *C08L 77/06* (2013.01); *C01B 33/42* (2013.01); *C08K 2003/026* (2013.01); *C08L 2201/02* (2013.01)

(58) Field of Classification Search
CPC ........................................................ C08K 9/02
See application file for complete search history.

(56) References Cited

U.S. PATENT DOCUMENTS

| 6,482,419 | B1 | 11/2002 | Miyazaki et al. |
|---|---|---|---|
| 6,547,992 | B1 | 4/2003 | Schlosser et al. |
| 6,783,584 | B2* | 8/2004 | Takahashi ................ A61K 8/19 |
| | | | 106/403 |
| 7,498,375 | B2* | 3/2009 | Harashina ................ C08K 5/34 |
| | | | 524/430 |
| 8,647,429 | B2 | 2/2014 | Melson et al. |
| 2004/0151900 | A1* | 8/2004 | Yoshida ................ B29C 55/023 |
| | | | 428/343 |
| 2006/0074157 | A1* | 4/2006 | Bauer ..................... C07F 9/301 |
| | | | 524/115 |

FOREIGN PATENT DOCUMENTS

| CN | 103254664 A | 8/2013 | |
|---|---|---|---|
| DE | 19960671 A1 | 9/2000 | |
| EP | 1407752 A1 | 4/2004 | |
| GB | 974874 A * | 11/1964 | ............ B82Y 30/00 |
| GB | 1556272 A * | 11/1979 | ........... C09C 1/0015 |
| JP | 2001302230 A | 10/2001 | |
| JP | 2006-016588 A | 1/2006 | |
| JP | 2007191608 A * | 8/2007 | |
| JP | 2008-074943 A | 4/2008 | |
| JP | 2008179735 A | 8/2008 | |
| WO | WO-2009/101973 A1 | 8/2009 | |
| WO | WO-2011/095326 A1 | 8/2011 | |

OTHER PUBLICATIONS

Machine translation of JP 2007191608 A, published Aug. 2, 2007. (Year: 2007).*
Feng, L., et al.,"Preparation of Sb2O3/Mica Nanoparticles and Flame Retardant Principle," *Journal of China University of Mining & Technology* (2005), vol. 34, No. 6, pp. 750-755. (English abstract).
International Preliminary Report on Patentability (Chapter II), International Application No. PCT/EP2015/079552, dated Nov. 7, 2016.
International Search Report (English translation), International Application No. PCT/EP2015/079552, dated Feb. 26, 2016.
Written Opinion, International Application No. PCT/EP2015/079552, dated Feb. 26, 2016.

* cited by examiner

*Primary Examiner* — Vickey Nerangis
(74) *Attorney, Agent, or Firm* — Marshall, Gerstein & Borun LLP

(57) ABSTRACT

The invention relates to the use of mica coated with at least one metal oxide as flame retardant, and also thermoplastic molding compositions provided therewith.

18 Claims, No Drawings

MICA COATED WITH METAL OXIDE AS A FLAME RETARDANT

CROSS-REFERENCE TO RELATED APPLICATIONS

This application is the U.S. National Stage application of International Patent Application No. PCT/EP2015/079552, filed Dec. 14, 2015, which claims the benefit of European Patent Application No. 14197853.6, filed Dec. 15, 2014.

The invention relates to the use of mica coated with at least one metal oxide as flame retardant, in particular for thermoplastic molding compositions, thermoplastic molding compositions comprising this, a process for the production thereof, the use thereof for producing moldings, fibers or films and such moldings, fibers or films and a process for the production thereof, and also the coated mica.

Metal oxide-coated mica flakes are known as effect pigments and are described, for example, in WO 2011/095326. There, the mica flakes are coated with a combination of $TiO_2$ and ZnO and optionally CaO. The effect pigments obtained in this way are used in decorative coating, in plastics, paints, varnishes, etc. Use as flame retardant is not described.

Flame retardants for thermoplastic polymers are known per se. DE-A-199 60 671 describes not only conventional flame retardants such as phosphinic acid salts and melamine compounds but also combinations with metal oxides, metal hydroxides or other salts. Mention is made inter alia of zinc oxide.

It is an object of the invention to provide flame retardants which in a small amount in combination with known flame retardants bring about a significant improvement in the fire resistance.

The object is achieved according to the invention by use of mica coated with at least one metal oxide as flame retardant.

In addition, the object is achieved by a thermoplastic molding composition comprising
a) from 5 to 99.9% by weight of at least one thermoplastic polymer as component A,
b) from 0.05 to 10% by weight of at least one mica coated with a metal oxide as component B,
c) from 0.05 to 50% by weight of at least one flame retardant different from component B as component C,
d) from 0 to 35% by weight of at least one functional polymer different from component A as component D,
e) from 0 to 60% by weight of glass fibers as component E,
f) from 0 to 10% by weight of further auxiliaries as component F,
where the total amount of the components A to E is 100% by weight.

The object is additionally achieved by a process for producing such thermoplastic molding compositions by mixing the constituents.

The object is also achieved by use of such thermoplastic molding compositions for producing moldings, fibers or films.

Furthermore, the object is achieved by moldings, fibers or films composed of such a thermoplastic molding composition.

The object is additionally achieved by a process for producing moldings, fibers or films by melting, extrusion and subsequent shaping of such thermoplastic molding compositions.

Furthermore, the invention provides a platelet-like support such as mica, glass flakes, aluminum flakes, preferably mica, coated with at least one metal oxide, wherein the at least one metal oxide is ZnO and/or $V_2O_5$ and not more than 20% by weight, based on the coated platelet-like support, preferably mica, of further metal oxides are present as coating.

It has been found according to the invention that mica coated with at least one metal oxide when used in even small amounts significantly increases the fire resistance of thermoplastic molding compositions.

For a description of mica, reference may be made to Rompp, Chemielexikon, $9^{th}$ edition, keyword "Glimmer". Mica is a phyllosilicate (sheet silicates). These are aluminosilicates which comprise alkali metals, hydroxyl groups and often also fluorine and can readily be cleaved along one plane. Examples of micas which can be used according to the invention are biotite and muscovite. Sericite, paragonite, lepidolite, phlogopite and margarite are also suitable.

The micas crystallize predominantly in the monoclinic crystal system as usually hexagonal flat platelets or tablet-like to short-column crystallites exhibiting pseudo hexagonal symmetry. The basic unit of the mica structure can be described as a sandwich-like layer packet which comprises a layer of octahedral comprising cations between two layers of tetrahedra having hexagonal symmetry. Apart from natural occurrence, mica can also be produced synthetically by slow solidification of a melt of $SiO_2$, MgO, $Al_2O_3$ and $K_2SiF_6$.

According to the invention, the mica is coated with at least one metal oxide. Here, the metal in the at least one metal oxide is preferably at least one metal selected from among Zn, V, Cu, Mn, Fe, Co, Nb, Mo, W, Sn.

The metal in the at least one metal oxide is particularly preferably Zn and/or V.

The amount of the metal oxide in the coating, based on the total amount of the mica with coating, is preferably from 0.1 to 90% by weight, particularly preferably from 5 to 80% by weight, most preferably from 20 to 50% by weight.

At least one metal oxide ZnO and/or $V_2O_5$ and not more than 20% by weight, preferably not more than 10% by weight, in particular not more than 5% by weight, especially not more than 1% by weight, based on the total amount of the mica with coating, of further metal oxides are preferably present.

In one embodiment of the invention, only ZnO and/or $V_2O_5$ are/is used as metal oxide coating on the mica.

Coating of the mica can be carried out as described in WO 2011/095326. To produce the coated mica, mica is typically suspended in water. The solution of a metal salt which is to form the metal oxide is then added to the suspension. Here, the pH can be set so that precipitation of a metal-comprising compound occurs. Metal oxides or hydroxides, carbonates, sulfates, chlorides, phosphates, borates or mixtures which can decompose predominantly into metal oxides on thermal treatment are typically precipitated. After the mica which has been coated in this way has been separated off from the liquid, it is dried and calcined. The incorporation of non-metallic additives (comprising Cl, P, B, carbonate, . . . ) in the range 0-20% can be preferred for the application.

The setting of the pH is preferably effected using acids or alkalis. Suitable acids/alkalis here are, for example, alkali metal hydroxide solutions, alkali metal carbonate solutions, alkaline earth metal hydroxide solutions or alkaline earth metal carbonate solutions, ammoniacal solutions, HCl, $H_2SO_4$, $HNO_3$ and also carbon-comprising acids and bases such as triethanolamine or methanesulfonic acid.

The precipitation of the metal oxide is preferably carried out in such a way that the surface of the substrate is predominantly homogeneously coated.

During the precipitation, the pH can be kept constant or can be varied.

The additives can be homogeneously distributed in the layer or can be concentrated at particular places or layer depths of the coating.

EP1469040A2, DE3137808, DE3151343 and DE3151354 describe the deposition of various metal oxides onto platelet-like substrates including ones having particle sizes and chemical compositions which are suitable for the purposes of the invention.

The suspension is preferably heated to a temperature in the range from 30 to 100° C., particularly preferably from 40 to 90° C. Drying is preferably carried out at a temperature in the range from 80 to 150° C., particularly preferably from 90 to 130° C. Calcination is preferably carried out at temperatures of from 500 to 1500° C., preferably from 600 to 1200° C., in particular from 700 to 1000° C. As an alternative, drying and calcinations can also be carried out directly in succession in one process step.

The drying and calcination has the additional advantage that hydroxyl groups or water remaining in the product are removed or converted into oxide.

The average particle size of the mica can be chosen freely. The average particle size, determined by light scattering, is preferably from 1 to 200 μm, particularly preferably from 5 to 100 μm, in particular from 8 to 80 μm. This $d_{50}$ value can be determined, for example, by light scattering using a Malvern 3000.

To improve the properties (e.g. mechanical) further, the surface area of the metal oxide-coated mica after the thermal treatment and the compatibility with the plastic can be increased and the performance can also be improved further by addition of, for example, bifunctional molecules. Suitable bifunctional molecules are silanes, phosphates and carboxylates.

To apply this layer, the metal oxide-coated platelet-like substrate is, after possible calcination, reacted with the bifunctional molecules. The bifunctional molecules can be introduced as pure components or else in prereacted or diluted form. The metal oxide-coated substrate is advantageously agitated during this step. This can be carried out either in suspension or in the dry state.

On this subject, reference may be made to EP0492223B1, E0688833B1, EP1478699B1, EP0888410 and EP0632109.

The mica coated with at least one metal oxide is, according to the invention, used as flame retardant, preferably in plastics. These can be thermoplastic or thermoset polymers, preferably thermoplastic polymers.

Examples of plastics suitable as component A are polymers of monoolefins and diolefins, e.g. polyethylene, polypropylene of various molecular weights, copolymers of monoolefins with diolefins, hydrocarbon resins, aromatic homopolymers and copolymers based on vinylaromatic monomers, for example polystyrene and polymethylstyrene, graft copolymers, for example of vinylaromatic monomers, halogen-comprising polymers such as polychloroprene, polyvinyl chloride, polymers based on ethylenically unsaturated acids and derivatives thereof, e.g. polyacrylates and polymethacrylates, polymers based on unsaturated alcohols and amines, homopolymers and copolymers of cyclic ethers, polyacetals such as polyoxymethylene, polyphenylene oxides and polyphenylene sulfides, polyurethanes, polyamides and copolyamides, polyureas, polyimides, polyethers, polyesters, polyketones, polysulfones, polyether sulfones, polyether ketones, polycarbonates and also polymer blends composed of two or more of these polymers.

Component A is preferably composed of polyamides or polyesters.

The polyamides of the molding compositions of the invention generally have a viscosity number of from 90 to 350 ml/g, preferably from 110 to 240 ml/g, determined in 0.5% strength by weight solution in 96% strength by weight sulfuric acid at 25° C. in accordance with ISO 307.

Semicrystalline or amorphous resins having a molecular weight (weight average) of at least 5000, as are described, for example, in the U.S. Pat. Nos. 2,071,250, 2,071,251, 2,130,523, 2,130,948, 2,241,322, 2,312,966, 2,512,606 and 3,393,210, are preferred.

Examples are polyamides derived from lactams having from 7 to 13 ring atoms, e.g. polycaprolactam, polycapryllactam and polylaurolactam, and polyamides obtained by reaction of dicarboxylic acids with diamines.

As dicarboxylic acids, it is possible to use alkanedicarboxylic acids having from 6 to 12, in particular from 6 to 10, carbon atoms and aromatic dicarboxylic acids. Mention will here be made of only adipic acid, azelaic acid, sebacic acid, dodecanedioic acid and terephthalic and/or isophthalic acid as acids.

Suitable diamines are, in particular, alkanediamines having from 6 to 12, in particular from 6 to 8, carbon atoms and also m-xylylenediamine, di(4-aminophenyl)methane, di(4-aminocyclohexyl)methane, 2,2-di(4-aminophenyl)propane, 2,2-di(4-aminocyclohexyl)propane or 1,5-diamino-2-methylpentane.

Preferred polyamides are polyhexamethyleneadipamide, polyhexamethylenesebacamide and polycaprolactam and also copolyamides 6/66, in particular having a proportion of from 5 to 95% by weight of caprolactam units.

Further suitable polyamides can be obtained from w-amino alkyl nitriles such as aminocapronitrile (PA 6) and adiponitrile with hexamethylenediamine (PA 66) by direct polymerization in the presence of water, as described, for example, in DE-A 10313681, EP-A 1198491 and EP 922065.

In addition, mention may also be made of polyamides which can be obtained by, for example, condensation of 1,4-diaminobutane with adipic acid at elevated temperature (polyamide 4,6). Preparative processes for polyamides having this structure are described, for example in EP-A 38 094, EP-A 38 582 and EP-A 39 524.

Polyamides which can be obtained by copolymerization of two or more of the abovementioned monomers or mixtures of a plurality of polyamides, where the mixing ratio can have any desired value, are also suitable.

Furthermore, partially aromatic copolyamides such as PA 6/6T and PA 66/6T, whose triamine content is preferably less than 0.5% by weight, more preferably less than 0.3% by weight (EP-A 299 444 and EP-A 667 367), have been found to be suitable.

Suitable copolyamides are made up of:
A1) from 20 to 90% by weight of units derived from terephthalic acid and hexamethylenediamine,
A2) from 0 to 50% by weight of units derived from ε-caprolactam and
A3) from 0 to 80% by weight of units derived from adipic acid and hexamethylenediamine,
A4) from 0 to 40% by weight of further polyamide-forming monomers, where the proportion of the component (A2) or (A3) or (A4) or mixtures thereof is at least 10% by weight.

The component A1) comprises from 20 to 90% by weight of units derived from terephthalic acid and hexamethylenediamine.

Apart from the units derived from terephthalic acid and hexamethylenediamine, the copolyamides optionally comprise units derived from ε-caprolactam and/or units derived from adipic acid and hexamethylenediamine and/or units derived from further polyamide-forming monomers.

Aromatic dicarboxylic acids A4) have from 8 to 16 carbon atoms. Suitable aromatic dicarboxylic acids are, for example, isophthalic acid, substituted terephthalic and isophthalic acids such as 3-t-butylisophthalic acid, polycyclic dicarboxylic acids, e.g. 4,4'- and 3,3'-biphenyldicarboxylic acid, 4,4'- and 3,3'-diphenylmethanedicarboxylic acid, 4,4'- and 3,3'-dicarboxyldiphenyl sulfone, 1,4- or 2,6-naphthalenedicarboxylic acid, phenoxyterephthalic acid, with particular preference being given to isophthalic acid.

Further polyamide-forming monomers A4) can be derived from dicarboxylic acids having from 4 to 16 carbon atoms and aliphatic or cycloaliphatic diamines having from 4 to 16 carbon atoms and also from aminocarboxylic acids or corresponding lactams having from 7 to 12 carbon atoms. As suitable monomers of these types, mention may be made here of only suberic acid, azelaic acid or sebacic acid as representatives of aliphatic dicarboxylic acids, 1,4-butanediamine, 1,5-pentanediamine, piperazine, 4,4'-diaminodicyclohexylmethane, 2,2-(4,4'-diaminodicyclohexyl)propane, 3,3'-dimethyl-4,4'-diaminodicyclohexylmethane or metaxylylene-diamine as representatives of diamines and capryllactam, enantholactam, ω-aminoundecanoic acid and laurolactam as representatives of lactams and aminocarboxylic acids.

Suitable copolyamides of this type are described in more detail in DE-A-10 2009 011 668.

The following nonexhaustive listing comprises the polyamides mentioned and also further polyamides suitable for the purposes of the invention and the comprised monomers.

AB Polymers:

| | |
|---|---|
| PA 4 | Pyrrolidone |
| PA 6 | ε-Caprolactam |
| PA 7 | Ethanolactam |
| PA 8 | Capryllactam |
| PA 9 | 9-Aminopelargonic acid |
| PA 11 | 11-Aminoundecanoic acid |
| PA 12 | Laurolactam |

AA/BB Polymers

| | |
|---|---|
| PA 46 | Tetramethylenediamine, adipic acid |
| PA 66 | Hexamethylenediamine, adipic acid |
| PA 69 | Hexamethylenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | 1,12-Dodecanediamine, decanedicarboxylic acid |
| PA 1313 | 1,13-Diaminotridecane, undecanedicarboxylic acid |
| PA6T | Hexamethylenediamine, terephthalic acid |
| PA MXD6 | m-Xylylenediamine, adipic acid |

AA/BB Polymers

| | |
|---|---|
| PA6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PAPACM 12 | Diaminodicyclohexylmethane, laurolactam |

PA 6I/6T/PACMT as PA 6I/6T+diaminodicyclohexylmethane, terephthalic acid

PA 6T/6I/MACMT as PA 6I/6T+dimethyldiaminocyclohexylmethane, terephthalic acid

PA 6T/6I/MXDT as PA 6I/6T+m-xylylenediamine, terephthalic acid

PA 12/MACMI Laurolactam, dimethyldiaminodicyclohexylrnethane, isophthalic acid

PA 12/MACMT Laurolactam, dimethyldiaminodicyclohexylmethane, terephthalic acid

PA PDA-T Phenylenediamine, terephthalic acid

Furthermore, a polyester/polycarbonate is preferably used according to the invention as component A.

In one embodiment of the process of the invention, the polyesters used according to the invention are prepared from aromatic or aliphatic hydroxycarboxylic acids. The aliphatic hydroxycarboxylic acids used in the polyesters according to the invention are $C_{1-12}$-carboxylic acids which comprise at least one OH group in addition to the COOH group and are optionally substituted by $C_{1-8}$-alkyl chains optionally substituted by further functional groups. Preference is given to hydroxycarboxylic acids selected from the group consisting of 2-hydroxyacetic acid, 2-hydroxypropionic acid, 3-hydroxypropionic acid, 4-hydroxybutyric acid, 5-hydroxypentanoic acid, 6-hydroxyhexanoic acid, malic acid, tartaric acid and citric acid. The aromatic hydroxycarboxylic acids which can be used according to the invention comprise 7-20 carbon atoms and at least one hydroxy function, with preference being given to using o-, m- or para-hydroxybenzoic acid in the polyesters which can be used according to the invention.

In a further embodiment of the process of the invention, the polyesters which can be used comprise diacids and diols.

The diacids comprised in the polyesters according to the invention can be aliphatic or aromatic diacids having from 4 to 18 carbon atoms. Preference is given to dicarboxylic acids selected from the group consisting of phthalic acid, terephthalic acid, isophthalic acid, naphthalene-1,4-dicarboxylic acid, naphthalene-2,3-dicarboxylic acid, naphthalene-2,6-dicarboxylic acid, cyclohexanedicarboxylic acid, cyclohexanediacetic acid, biphenyl-4,4'-dicarboxylic acid, succinic acid, glutaric acid, adipic acid, azelaic acid and sebacic acid and mixtures thereof.

The diacids comprised in the polyester are particularly preferably selected from among terephthalic acid and naphthalenediacid and mixtures thereof.

The diols comprised in the polyester which can be used according to the invention can be cycloaliphatic diols having from 6 to 20 carbon atoms or aliphatic diols having from 2 to 20 carbon atoms. The diol comprised in the polyester is preferably selected from the group consisting of ethylene glycol, diethylene glycol, triethylene glycol, 1,4-cyclohexanedimethanol, propane-1,3-diol, butane-1,4-diol, pentane-1,5-diol, hexane-1,6-diol, 3-methylpentane-2,4-diol, 2-methylpentane-1,4-diol, 2,2,4-trimethylpentane-1,3-diol, hexane-1,3-diol, 2,2-bis(4-hydroxycyclohexyl)propane and 2,4-dihydroxy-1,1,3,3-tetramethylcyclobutane and mixtures thereof.

In a preferred embodiment, the polyester which can be used according to the invention comprises ethylene glycol as diol component.

In a particularly preferred embodiment of the present invention, homopolymers of polyethylene terephthalate (PET), polybutylene terephthalate (PBT) or polyethylene naphthalate (PEN) or mixtures thereof are used as polyesters.

The homopolymers of polyethylene terephthalate or polybutylene terephthalate used according to the invention preferably have a logarithmic viscosity number of from 0.50 to 0.99, particularly preferably from 0.60 to 0.85, very particularly preferably from 0.65 to 0.80.

The molecular weight of the polyesters which can be used according to the invention is preferably in the range from 10 000 to 50 000 g/mol.

The preparation of the polyesters used according to the invention is carried out by processes known to those skilled in the art, see Encycl. Polym. Sci. Engng. 12, 1-313, and Houben-Weyl E20/2, 1405-1429, Ullmann (4$^{th}$) 19, 61-88.

Furthermore, it is advantageous to use recycled PET material (also referred to as scrap PET), optionally in admixture with polyalkylene terephthalates such as PBT.

Recycled material is in general:
1) post industrial recycled material: this constitutes production waste in the polycondensation or in processing, e.g. sprues in processing by injection molding, start-up material during processing by injection molding or extrusion or peripheral cut-offs of extruded sheets or films.
2) post consumer recycled material: this constitutes plastic articles which are collected and processed after utilization by the end consumer. The articles which predominate by far in terms of quantity are blow-molded PET bottles for mineral water, soft drinks and fruit juices.

Both types of recycled material can be in the form of either milled material or pellets. In the latter case, the raw recycled materials are, after being separated off and purified, melted in an extruder and pelletized. The handling, the flowability and the meterability for further processing steps is usually made easier in this way.

Both pelletized and milled recycled materials can be used, with the maximum edge length preferably being 10 mm, more preferably less than 8 mm.

Owing to the hydrolytic dissociation of polyesters during processing (due to traces of moisture), it is advisable to predry the recycled material. The residual moisture content after drying is preferably <0.2%, in particular <0.05%.

As a further group, mention may be made of fully aromatic polyesters derived from aromatic dicarboxylic acids and aromatic dihydroxy compounds.

Suitable aromatic dicarboxylic acids are the compounds described above in the case of polyalkylene terephthalates. Preference is given to using mixtures of from 5 to 100 mol % of isophthalic acid and from 0 to 95 mol % of terephthalic acid, in particular mixtures of about 80% of terephthalic acid with 20% of isophthalic acid through to approximately equivalent mixtures of these two acids.

The aromatic dihydroxy compounds preferably have the general formula

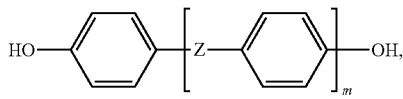

where Z is an alkylene or cycloalkylene group having up to 8 carbon atoms, an arylene group having up to 12 carbon atoms, a carbonyl group, a sulfonyl group, an oxygen or sulfur atom or a chemical bond and m is from 0 to 2. The compounds can also bear $C_1$-$C_6$-alkyl or alkoxy groups and fluorine, chlorine or bromine as substituents on the phenylene groups.

As parent molecules of these compounds, mention may be made by way of example of
dihydroxybiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
di(hydroxyphenyl) sulfone, di(hydroxybenzoyl)benzene,
resorcinol and hydroquinone and also ring-alkylated or ring-halogenated derivatives thereof.

Among these, preference is given to
4,4'-dihydroxybiphenyl,
2,4-di(4'-hydroxyphenyl)-2-methylbutane
α,α'-di(4-hydroxyphenyl)-p-diisopropylbenzene,
2,2-di(3'-methyl-4'-hydroxyphenyl)propane and
2,2-di(3'-chloro-4'-hydroxyphenyl)propane,
  and in particular
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane
  or mixtures thereof.

Of course, it is also possible to use mixtures of polyalkylene terephthalates and fully aromatic polyesters. These generally comprise from 20 to 98% by weight of the polyalkylene terephthalate and from 2 to 80% by weight of the fully aromatic polyester.

Of course, it is also possible to use polyester block copolymers such as copolyether esters. Such products are known per se and are described in the literature, e.g. in U.S. Pat. No. 3,651,014. Such products are also commercially available, e.g. Hytrel® (DuPont).

According to the invention, polyesters also include halogen-free polycarbonates. Suitable halogen-free polycarbonates are, for example, those based on diphenols of the general formula

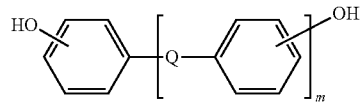

where Q is a single bond, a $C_1$-$C_8$-alkylene group, a $C_2$-$C_3$-alkylidene group, a $C_3$-$C_6$-cycloalkylidene group, a $C_6$-$C_{12}$-arylene group or —O—, —S— or —SO$_2$— and m is an integer from 0 to 2.

The diphenols can also have substituents such as $C_1$-$C_6$-alkyl or $C_1$-$C_6$-alkoxy on the phenylene radicals.

Preferred diphenols of the formula are, for example, hydroquinone, resorcinol, 4,4'-dihydroxybiphenyl, 2,2-bis (4-hydroxyphenyl)propane, 2,4-bis(4-hydroxyphenyl)-2-methylbutane, 1,1-bis(4-hydroxyphenyl)cyclohexane. Particular preference is given to 2,2-bis(4-hydroxyphenyl)- propane and 1,1-bis(4-hydroxyphenyl)cyclohexane and also 1,1-bis(4-hydroxyphenyl)-3,3,5-trimethylcyclohexane.

Both homopolycarbonates and copolycarbonates are suitable as component A, with preference being given to the bisphenol A homopolymer and the copolycarbonates of bisphenol A.

The suitable polycarbonates can be branched in a known manner, preferably by incorporation of from 0.05 to 2.0 mol %, based on the sum of the diphenols used, of at least trifunctional compounds, for example ones having three or more than three phenolic OH groups.

Polycarbonates which have relative viscosities $\eta_{rel}$ of from 1.10 to 1.50, in particular from 1.25 to 1.40, corresponding to average molecular weights $M_w$ (weight average) of from 10 000 to 200 000 g/mol, preferably from 20 000 to 80 000 g/mol, have been found to be particularly suitable.

The diphenols of the general formula are known per se or can be prepared by known methods.

The preparation of the polycarbonates can, for example, be carried out by reaction of the diphenols with phosgene in the phase interface process or with phosgene in the homogeneous-phase process (known as the pyridine process), in which the molecular weight to be set in each case is achieved in a known manner by means of an appropriate amount of known chain terminators. (With regard to polydiorganosiloxane-comprising polycarbonates, see, for example, DE-A 33 34 782).

Suitable chain terminators are, for example, phenol, p-t-butylphenol or else long-chain alkylphenols such as 4-(1,3-tetramethylbutyl)phenol, as described in DE-A 28 42 005, or monoalkylphenols or dialkylphenols having a total of from 8 to 20 carbon atoms in the alkyl substituents, as described in DE-A 35 06 472, e.g. p-nonylphenol, 3,5-di-t-butylphenol, p-t-octylphenol, p-dodecylphenol, 2-(3,5-dimethylheptyl)phenol and 4-(3,5-dimethylheptyl)phenol.

For the purposes of the present invention, the expression halogen-free polycarbonates means that the polycarbonates are made up of halogen-free diphenols, halogen-free chain terminators and optionally halogen-free branching agents, with the content of minor ppm amounts of hydrolysable chlorine, resulting, for example, from the preparation of the polycarbonates using phosgene by the phase interface process, not being considered to constitute halogen-comprising for the purposes of the invention. Such polycarbonates having ppm contents of hydrolysable chlorine are halogen-free polycarbonates for the purposes of the present invention.

As further suitable components A) mention may be made of amorphous polyester carbonates in the preparation of which phosgene has been replaced by aromatic dicarboxylic acid units such as isophthalic acid and/or terephthalic acid units. For further details, reference may at this point be made to EP-A 711 810.

Further suitable copolycarbonates having cycloalkyl radicals as monomer units are described in EP-A 365 916.

Furthermore, bisphenol A can be replaced by bisphenol TMC. Such polycarbonates are obtainable under the trade name APEC HT® from Bayer.

As component B, the above-described mica coated with at least one metal oxide is used.

As component C, at least one flame retardant different from component B is used.

It is possible to use any suitable flame retardants as component C.

Red phosphorus as example of a preferred flame retardant

Red phosphorus is such a preferred flame retardant. It can be used in untreated form, in particular in conjunction with fiber-reinforced molding compositions.

The red phosphorus can also be coated with low molecular weight liquid substances such as silicone oil, paraffin oil or esters of phthalic acid or adipic acid or with polymeric or oligomeric compounds such as phenolic resins or amino plastics or else with polyurethanes. The proportion of these agents is generally from 0.05 to 5% by weight, based on the red phosphorus.

Red phosphorus can also be used in the form of concentrates. Such concentrates can comprise from 30 to 90% by weight, preferably from 45 to 70% by weight, of a polyamide or elastomer and from 10 to 70% by weight, preferably from 30 to 55% by weight, of red phosphorus.

Red phosphorus can also be present in aqueous solution or suspension of the respective additive, in which case it is filtered off, washed with water and dried before use. The average particle size ($D_{50}$) of phosphorus particles dispersed in molding compositions is preferably in the range from 0.0001 to 0.5 mm, preferably from 0.001 to 0.2 mm.

Examples of preferred flame retardants of the component C are metal phosphinates which are derived from hypophosphorous acid. For example, it is possible to use a metal salt of hypophosphorous acid with Mg, Ca, Al or Zn as metal. Particular preference is given here to aluminum hypophosphite.

Phosphinic acid salts of the formula (I) or/and diphosphinic acid salts of the formula (II) or polymers thereof

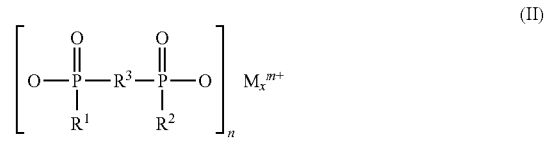

where
$R^1$, $R^2$ are identical or different and are each hydrogen, $C_1$-$C_6$-alkyl, linear or branched, or aryl;
$R^3$ is $C_1$-$C_{10}$-alkylene, linear or branched, $C_6$-$C_{10}$-arylene, -alkylarylene or -arylalkylene;
M is Mg, Ca, Al, Sb, Sn, Ge, Ti, Zn, Fe, Zr, Ce, Bi, Sr, Mn, Li, Na, K and/or a protonated nitrogen base;
m is from 1 to 4; n is from 1 to 4; x is from 1 to 4, preferably m=3, x=3, are also suitable.

Preference is given to $R^1$, $R^2$ of the component B being identical or different and each being hydrogen, methyl, ethyl, n-propyl, isopropyl, n-butyl, tert-butyl, n-pentyl or phenyl.

$R^3$ of the component B is preferably methylene, ethylene, n-propylene, isopropylene, n-butylene, tert-butylene, n-pentylene, n-octylene or n-dodecylene, phenylene or naphthylene; methylphenylene, ethylphenylene, tert-butylphenylene, methylnaphthylene, ethylnaphthylene or tert-butylnaphthylene; phenylmethylene, phenylethylene, phenylpropylene or phenylbutylene.

Particular preference is given to $R^1$, $R^2$ being hydrogen, methyl, ethyl and M being Al, with Al hypophosphite being particularly preferred.

The phosphinates are preferably prepared by precipitation of the appropriate metal salts from aqueous solutions. However, the phosphinates can also be precipitated in the presence of a suitable inorganic metal oxide or sulfide as support material (white pigments such as $TiO_2$, $SnO_2$, ZnO, ZnS, $SiO_2$). This gives surface-modified pigments which can be used as laser-markable flame retardants for thermoplastic polyesters.

Preference is given to using metal salts of substituted phosphinic acids in which, compared to hypophosphorous acid, one or two hydrogen atoms have been replaced by phenyl, methyl, ethyl, propyl, isobutyl, isooctyl or R'—CH—OH radicals where R' is hydrogen, phenyl, tolyl. The metal is preferably Mg, Ca, Al, Zn, Ti, Fe. Particular preference is given to aluminum diethylphosphinate (DE-PAL).

For a description of phosphinic acid salts or diphosphinic acid salts, reference may be made to DE-A-199 60 671 and also DE-A-44 30 932 and DE-A-199 33 901.

Suitable halogen-comprising flame retardants are preferably brominated compounds such as brominated diphenyl ether, brominated trimethylphenylindanes (FR 1808 from DSB), tetrabromobisphenol A and hexabromocyclododecane.

Suitable flame retardants are preferably brominated compounds such as brominated oligocarbonates (BC 52 or BC 58 from Great Lakes) of the structural formula:

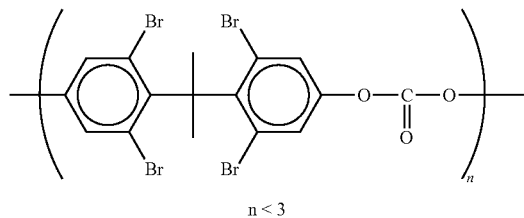

n < 3

Polypentabromobenzyl acrylates having n>4 (e.g. FR 1025 from ICL-IP) of the formula:

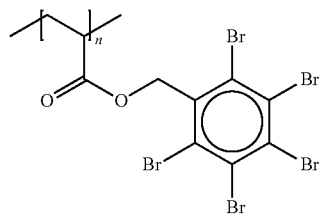

are particularly suitable.

Preferred brominated compounds also include oligomeric reaction products (n>3) of tetrabromobisphenol A with epoxides (e.g. FR 2300 and 2400 from DSB) of the formula:

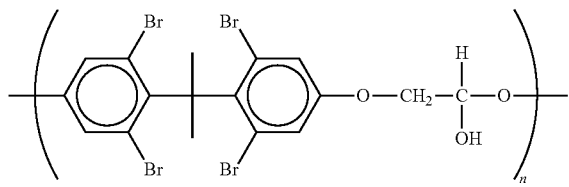

The brominated oligostyrenes which are preferably used as flame retardants have an average degree of polymerization (number average) in the range from 3 to 90, preferably from 5 to 60, measured by vapor pressure osmometry in toluene. Cyclic oligomers are likewise suitable. In a preferred embodiment of the invention, the brominated oligomeric styrenes to be used have the formula I below, where R is hydrogen or an aliphatic radical, in particular an alkyl radical such as $CH_2$ or $C_2H_5$, and n is the number of repeating building blocks in the chain. $R^1$ can be either H or bromine or else a fragment of a conventional free-radical former:

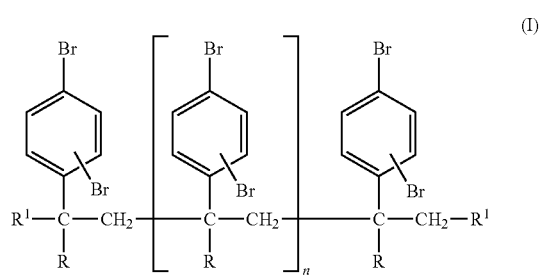

The value of n can be 1-88, preferably 3-58. The brominated oligostyrenes comprise from 40 to 80% by weight, preferably from 55 to 70% by weight, of bromine. Preference is given to a product which consists predominantly of polydibromostyrene. The substances can be melted without decomposition and are soluble in, for example, tetrahydrofuran. They can be prepared either by ring bromination of optionally aliphatically hydrogenated styrene oligomers as are obtained, for example, by thermal polymerization of styrene (as per DT-A 25 37 385) or by free-radical oligomerization of suitable brominated styrenes. The preparation of the flame retardant can also be carried out by ionic oligomerization of styrene and subsequent bromination. The amount of brominated oligostyrene necessary for making the polyamides flame resistant depends on the bromine content. The bromine content in the molding compositions of the invention is from 2 to 30% by weight, preferably from 5 to 12% by weight.

The brominated polystyrenes according to the invention are usually obtained by the process described in EP-A 47 549:

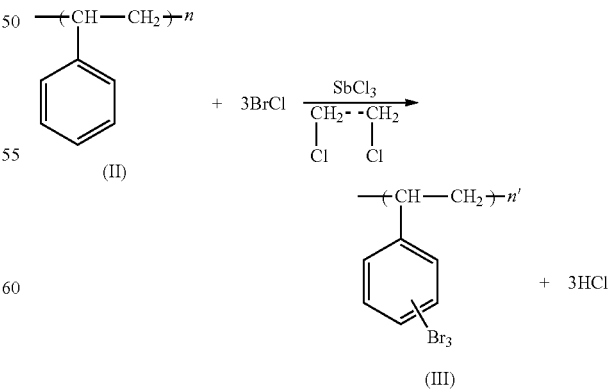

The brominated polystyrenes which can be obtained by this process and commercially are predominantly ring-substituted tribrominated products. n' (see III) generally has values of from 125 to 1500, corresponding to a molecular weight of from 42 500 to 235 000, preferably from 130 000 to 135 000.

The bromine content (based on the content of ring-substituted bromine) is generally at least 50% by weight, preferably at least 60% by weight and in particular 65% by weight.

The commercially available pulverulent products generally have a glass transition temperature of from 160 to 200° C. and can be obtained, for example, under the names HP 7010 from Albemarle and Pyrocheck PB 68 from Ferro Corporation.

It is also possible to use mixtures of the brominated oligostyrenes with brominated polystyrenes in the molding compositions of the invention, with any mixing ratio being possible.

Further suitable flame retardants are chlorine-comprising flame retardants, with Declorane plus from Oxychem being preferred.

Suitable halogen-comprising flame retardants are preferably ring-brominated polystyrene, brominated polybenzyl acrylates, brominated bisphenol A-epoxide oligomers or brominated bisphenol A polycarbonates.

Another possibility is a nitrogen compound, preferably a melamine compound, for example melamine borate, melamine phosphate, melamine sulfate, melamine pyrophosphate, melamine polyphosphate, melam, melem, melon or melamine cyanurate.

The melamine cyanurate which is preferably suitable for the purposes of the invention is a reaction product of preferably equimolar amounts of melamine (formula I) and cyanuric acid or isocyanuric acid (formulae Ia and Ib)

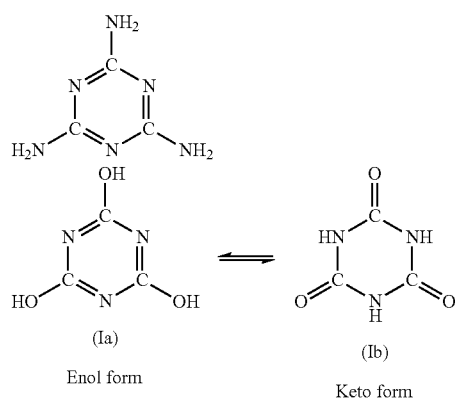

It is obtained, for example, by reaction of aqueous solutions of the starting compounds at from 90 to 100° C. The commercially available product is a white powder having an average particle size $d_{50}$ of 1.5-7 μm and a $d_{99}$ value of less than 50 μm.

Further suitable compounds (often also referred to as salts or adducts) are melamine sulfate, melamine, melamine borate, oxalate, phosphate prim., phosphate sec. and pyrophosphate sec., neopentyl glycol boric acid melamine and polymeric melamine phosphate (CAS No. 56386-64-2 or 218768-84-4).

Preference is given to melamine polyphosphate salts of a 1,3,5-triazine compound in which the number n of the average degree of condensation is in the range from 20 to 200 and the 1,3,5-triazine content is from 1.1 to 2.0 mol of a 1,3,5-triazine compound selected from the group consisting of melamine, melam, melem, melon, ammeline, ammelide, 2-ureidomelamine, acetoguanamine, benzoguanamine and diaminophenyltriazine, per mole of phosphorous atoms. The n value of such salts is generally in the range from 40 to 150 and the ratio of a 1,3,5-triazine compound per mole of phosphorous atoms is preferably in the range from 1.2 to 1.8. Furthermore, the pH of a 10% strength by weight aqueous slurry of salts prepared as described in EP-B1095030 will generally be more than 4.5 and preferably at least 5.0. The pH is usually determined by 25 g of the salt and 225 g of clean water at 25° C. being placed in a 300 ml beaker stirring the resulting aqueous slurry for 30 minutes and then measuring the pH. The abovementioned n value, viz. the number average degree of condensation, can be determined by means of solid-state $^{31}$P-NMR. It is known from J. R. van Wazer, C. F. Callis, J. Shoolery and R. Jones, J. Am. Chem. Soc., 78, 5715, 1956, that the number of adjacent phosphate groups gives a unique, chemical shift which allows a clear distinction to be made between orthophosphates, pyrophosphates and polyphosphates. In addition, EP1095030B1 describes a process for preparing the desired polyphosphate salt of a 1,3,5-triazine compound which has an n value of from 20 to 200 and a 1,3,5-triazine content of from 1.1 to 2.0 mol of a 1,3,5-triazine compound. This process comprises conversion of a 1,3,5-triazine compound by means of orthophosphoric acid into its orthophosphate salt, followed by dehydration and heat treatment in order to convert the orthophosphate salt into a polyphosphate of the 1,3,5-triazine compound. This heat treatment is preferably carried out at a temperature of at least 300° C., preferably at least 310° C. In addition to orthophosphates of 1,3,5-triazine compounds, it is likewise possible to use other 1,3,5-triazine phosphates, including, for example, a mixture of orthophosphates and pyrophosphates.

Suitable guanidine salts are

|  | CAS No. |
|---|---|
| G carbonate | 593-85-1 |
| G cyanurate prim. | 70285-19-7 |
| G phosphate prim. | 5423-22-3 |
| G phosphate sec. | 5423-23-4 |
| G sulfate prim. | 646-34-4 |
| G sulfate sec. | 594-14-9 |
| Pentaerythritol boric acid guanidine | N.A. |
| Neopentyl glycol boric acid guanidine | N.A. |
| and also urea phosphate green | 4861-19-2 |
| Urea cyanurate | 57517-11-0 |
| Ammeline | 645-92-1 |
| Ammelide | 645-93-2 |
| Melem | 1502-47-2 |
| Melon | 32518-77-7 |

For the purposes of the present invention, compounds include both, for example, benzoguanamine itself and adducts or salts thereof and also the derivatives and adducts or salts thereof which are substituted on the nitrogen.

Further suitable compounds are ammonium polyphosphate $(NH_4PO_3)_n$ where n is from about 200 to 1000, preferably from 600 to 800, and tris(hydroxyethyl) isocyanurate (THEIC) of the formula IV

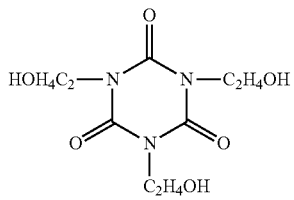

or the reaction products thereof with aromatic carboxylic acids $Ar(COOH)_m$, which can optionally be present in admixture with one another, where Ar is a monocyclic, bicyclic or tricyclic aromatic six-membered ring system and m is 2, 3 or 4.

Suitable carboxylic acids are, for example, phthalic acid, isophthalic acid, terephthalic acid, 1,3,5-benzenetricarboxylic acid, 1,2,4-benzenetricarboxylic acid, pyromellitic acid, mellophanic acid, prehnitic acid, 1-naphthoic acid, 2-naphthoic acid, naphthalenedicarboxylic acids and anthracenecarboxylic acids.

The preparation is carried out by reaction of tris(hydroxyethyl) isocyanurate with the acids, alkyl esters thereof or halides thereof as per the process of EP-A 584 567.

Such reaction products are mixtures of monomeric and oligomeric esters which may also be crosslinked. The degree of oligomerization is usually from 2 to about 100, preferably from 2 to 20. Preference is given to using mixtures of THEIC and/or reaction products thereof with phosphorus-comprising nitrogen compounds, in particular $(NH_4PO_3)_n$ or melamine pyrophosphate or polymeric melamine phosphate. The mixing ratio of, for example, $(NH_4PO_3)_n$ to THEIC is preferably from 90:50 to 10:50, in particular from 80:50 to 50:20 on a weight basis, based on the mixture of components B1) of this type.

Further suitable compounds are benzoguanamine compounds of the formula V

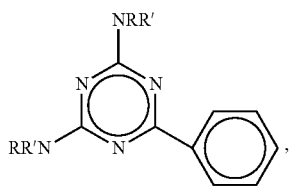

where R,R' are linear or branched alkyl radicals having from 1 to 10 carbon atoms, preferably hydrogen, and in particular adducts thereof with phosphoric acid, boric acid and/or pyrophosphoric acid.

Preference is also given to allantoin compounds of the formula VI

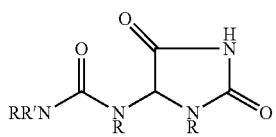

where R,R' are as defined for formula V and also salts thereof with phosphoric acid, boric acid and/or pyrophosphoric acid, and also glycolurils of the formula VII or salts thereof with the abovementioned acids

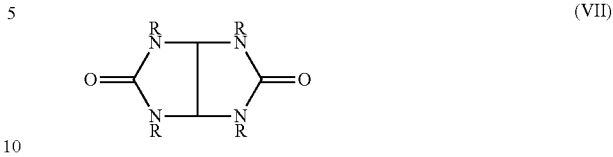

where R is as defined for formula V.

Suitable products are commercially available or can be obtained as described in DE-A 196 14 424.

The cyanoguanidine (formula VIII) which can be used according to the invention is obtained, for example, by reaction of calcium cyanamide with carbonic acid, with the cyanamide formed dimerizing to cyanoguanidine at pH 9-10.

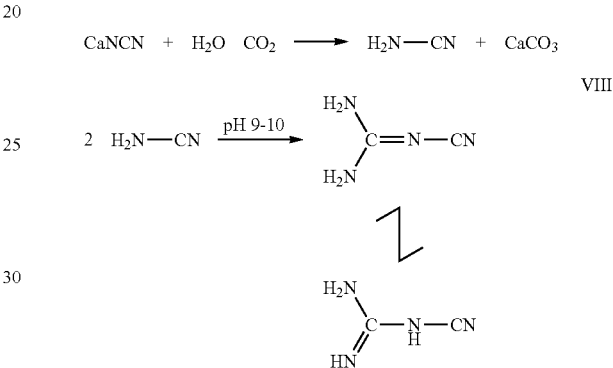

The commercially available product is a white powder having a melting point of from 209° C. to 211° C.

Particular preference is given to using melamine cyanurate (for example Melapur MC25 from BASF SE) or melamine polyphosphate (for example Melapur M200 from BASF SE).

Furthermore, it is possible to use separate metal oxides such as antimony trioxide, antimony pentoxide, sodium antimonate and similar metal oxides. However, the use of such metal oxides is preferably dispensed with since they are already present in component B. For a description of pentabromobenzyl acrylate and antimony trioxide or antimony pentoxide, reference may be made to EP-A-0 624 626.

Furthermore, phosphorus, for example red phosphorus, can be used as component C. Here, red phosphorus can be used, for example, in the form of a masterbatch.

Further possibilities are dicarboxylic acid salts of the formula

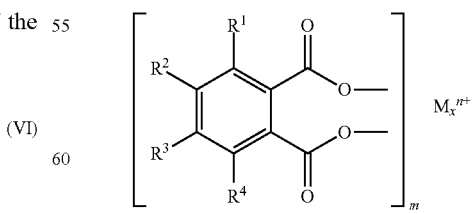

where
$R^1$ to $R^4$ are each, independently of one another, halogen or hydrogen, with the proviso that at least one radical $R^1$ to $R^4$ is halogen, x=1 to 3, preferably 1 or 2, m=1 to 9, preferably from 1 to 3, 6, 9, in particular from 1 to 3, n=2 to 3, M=alkaline earth metal, Ni, Ce, Fe, In, Ga, Al, Pb, Y, Zn, Hg.

Preferred dicarboxylic acid salts comprise, independently of one another, Cl or bromine or hydrogen as radicals $R^1$ to $R^4$, with particular preference being given to all radicals $R^1$ to $R^4$ being Cl or/and Br.

As metals M, preference is given to Be, Mg, Ca, Sr, Ba, Al, Zn, Fe.

Such dicarboxylic acid salts are commercially available or can be prepared by the process described in U.S. Pat. No. 3,354,191.

Component C is preferably a phosphinic acid salt, a halogen-comprising flame retardant, phosphorus, a melamine compound or a mixture of two or more thereof.

Component C can preferably be selected from among c1) aluminum diethylphosphinate and/or aluminum hypophosphite, c2) aluminum diethylphosphinate and/or aluminum phosphite in combination with at least one melamine compound, c3) red phosphorus, c4) polypentabromobenzyl acrylate.

As component D, it is possible to use functional polymers different from component A. These can be, for example, flame retardant polymers. Such polymers are described, for example, in U.S. Pat. No. 8,314,202 and have 1,2-bis[4-(2-hydroxyethoxy)phenyl]ethanone repeating units. A further suitable functional polymer for increasing the amount of carbon residue is poly(2,6-dimethyl-1,4-phenylene oxide) (PPPO).

Rubber-elastic polymers (often also referred to as impact modifiers, elastomers or rubbers) are also possible.

Quite generally, the polymers of component D are copolymers which are preferably made up of at least two of the following monomers: ethylene, propylene, butadiene, isobutene, isoprene, chloroprene, vinyl acetate, styrene, acrylonitrile and acrylic or methacrylic esters having from 1 to 18 carbon atoms in the alcohol component.

Such polymers are described, for example, in Houben-Weyl, Methoden der organischen Chemie, vol. 14/1 (Georg-Thieme-Verlag, Stuttgart, 1961), pages 392 to 406, and in the monograph by C. B. Bucknall, "Toughened Plastics" (Applied Science Publishers, London, 1977).

Some preferred types of such elastomers are presented below.

Preferred types of elastomers are ethylene-propylene (EPM) or ethylene-propylene-diene (EPDM) rubbers.

EPM rubbers generally have virtually no double bonds, while EPDM rubbers can have from 1 to 20 double bonds/100 carbon atoms.

As diene monomers for EPDM rubbers, mention may be made by way of example of conjugated dienes such as isoprene and butadiene, nonconjugated dienes having from 5 to 25 carbon atoms, e.g. penta-1,4-diene, hexa-1,4-diene, hexa-1,5-diene, 2,5-dimethylhexa-1,5-diene and octa-1,4-diene, cyclic dienes such as cyclopentadiene, cyclohexadienes, cyclooctadienes and dicyclopentadiene and also alkenylnorbornenes such as 5-ethylidene-2-norbornene, 5-butylidene-2-norbornene, 2-methallyl-5-norbornene, 2-isopropenyl-5-norbornene and tricyclodienes such as 3-methyltricyclo[5.2.1.0.2.6]-3,8-decadiene or mixtures thereof. Preference is given to hexa-1,5-diene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers can preferably also be grafted with reactive carboxylic acids or derivatives thereof. Mention may here be made of, for example, acrylic acid, methacrylic acid and derivatives thereof, e.g. glycidyl (meth)acrylate, and also maleic anhydride.

A further group of preferred rubbers comprises copolymers of ethylene with acrylic acid and/or methacrylic acid and/or the esters of these acids. In addition, the rubbers can additionally comprise dicarboxylic acids such as maleic acid and fumaric acid or derivatives of these acids, e.g. esters and anhydrides, and/or monomers comprising epoxy groups. These dicarboxylic acid derivatives or monomers comprising epoxy groups are preferably incorporated into the rubber by addition of monomers of the general formula I or II or III or IV comprising dicarboxylic acid or epoxy groups to the monomer mixture,

where $R^1$ to $R^9$ are each hydrogen or an alkyl group having from 1 to 6 carbon atoms and m is an integer from 0 to 20, g is an integer from 0 to 10 and p is an integer from 0 to 5.

The radicals $R^1$ to $R^9$ are preferably hydrogen, with m being 0 or 1 and g being 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and esters of acrylic acid and/or methacrylic acid comprising epoxy groups, e.g. glycidyl acrylate, glycidyl methacrylate and the esters with tertiary alcohols, e.g. t-butyl acrylate. Although the latter do not have any free carboxyl groups, their behavior comes close to that of the free acids and they are therefore referred to as monomers having latent carboxyl groups.

The copolymers advantageously comprise from 50 to 98% by weight of ethylene, from 0.1 to 20% by weight of monomers comprising epoxy groups and/or methacrylic acid and/or monomers comprising acid anhydride groups and also the residual amount of (meth)acrylic esters.

Particular preference is given to copolymers composed of from 50 to 98% by weight, in particular from 55 to 95% by weight, of ethylene, from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 10 to 40% by weight, of n-butyl acrylate and/or 2-ethylhexyl acrylate.

Further preferred esters of acrylic and/or methacrylic acid are the methyl, ethyl, propyl and i- or t-butyl esters.

In addition, it is also possible to use vinyl esters and vinyl ethers as comonomers.

The above-described ethylene copolymers can be prepared by processes known per se, preferably by random copolymerization under high pressure and elevated temperature. Corresponding processes are generally known.

Preferred elastomers also include emulsion polymers, the preparation of which is described, for example, by Blackley in the monograph "Emulsion Polymerization". The emulsifiers and catalysts which can be used are known per se.

It is in principle possible to use elastomers having a homogeneous structure or else ones having a shell structure. The shell-like structure is determined by the order of addition of the individual monomers; the morphology of the polymers is also influenced by this order of addition.

Purely by way of example, acrylates such as n-butyl acrylate and 2-ethylhexyl acrylate, corresponding methacrylates, butadiene and isoprene and also mixtures thereof may be mentioned here as monomers for the preparation of the rubber part of the elastomers. These monomers can be copolymerized with further monomers such as styrene, acrylonitrile, vinyl ethers and further acrylates or methacrylates such as methyl methacrylate, methyl acrylate, ethyl acrylate and propyl acrylate.

The soft or rubber phase (having a glass transition temperature of less than 0° C.) of the elastomers can form the core, the outer shell or an intermediate shell (in the case of elastomers having a more than two-shell structure); in the case of multishell elastomers, it is also possible for a plurality of shells to consist of a rubber phase.

If not only the rubber phase but also one or more hard components (having glass transition temperatures of more than 20° C.) participate in the make-up of the elastomer, these are generally prepared by polymerization of styrene, acrylonitrile, methacrylonitrile, α-methylstyrene, p-methylstyrene, acrylic esters and methacrylic esters, e.g. methyl acrylate, ethyl acrylate and methyl methacrylate, as main monomers. In addition, relatively small proportions of further comonomers can also be used here.

In some cases, it has been found to be advantageous to use emulsion polymers which have reactive groups on the surface. Such groups are, for example, epoxy, carboxyl, latent carboxyl, amino or amido groups and also functional groups which can be introduced by concomitant use of monomers of the general formula

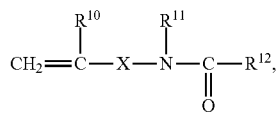

where the substituents can have the following meanings:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group or —$OR^{13}$,
$R^{13}$ is a $C_1$-$C_8$-alkyl or $C_6$-$C_{12}$-aryl group which may optionally be substituted by 0- or N-comprising groups,
X is a chemical bond, a $C_1$-$C_{10}$-alkylene or $C_6$-$C_{12}$-arylene group or

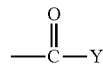

Y is O—Z or NH—Z and
Z is a $C_1$-$C_{10}$-alkylene or $C_6$-$C_{12}$-arylene group.

The graft monomers described in EP-A 208 187 are also suitable for introducing reactive groups on the surface.

As further examples, mention may also be made of acrylamide, methacrylamide and substituted esters of acrylic acid or methacrylic acid, e.g. (N-t-butylamino)ethyl methacrylate, (N,N-dimethyl-amino)ethyl acrylate, (N,N-dimethylamino)methyl acrylate and (N,N-diethylamino)ethyl acrylate.

Furthermore, the particles of the rubber phase can also be crosslinked. Monomers acting as crosslinkers are, for example, buta-1,3-diene, divinylbenzene, diallyl phthalate and dihydrodicyclopentadienyl acrylate and also the compounds described in EP-A 50 265.

It is also possible to use graft-linking monomers, i.e. monomers having two or more polymerizable double bonds which react at different rates during the polymerization. Preference is given to using compounds in which at least one reactive group polymerizes at about the same rate as the remaining monomers, while the other reactive group (or reactive groups) polymerizes (polymerize), for example, significantly more slowly. The different polymerization rates bring about a particular proportion of unsaturated double bonds in the rubber. If a further phase is subsequently grafted onto such a rubber, the double bonds present in the rubber react at least partly with the graft monomers to form chemical bonds, i.e. the grafted-on phase is at least partly linked via chemical bonds to the graft base.

Examples of such graft-linking monomers are monomers comprising allyl groups, in particular allyl esters of ethylenically unsaturated carboxylic acids, e.g. allyl acrylate, allyl methacrylate, diallyl maleate, diallyl fumarate, diallyl itaconate or the corresponding monoallyl compounds of these dicarboxylic acids. In addition, there are many further suitable graft-linking monomers; for further details, reference may be made, for example, to U.S. Pat. No. 4,148,846.

In general, the proportion of these crosslinking monomers in the polymer to be impact modified is up to 5% by weight, preferably not more than 3% by weight, based on the polymer to be impact modified.

Some preferred emulsion polymers are indicated below. Firstly, mention may here be made of graft polymers having a core and at least one outer shell and having the following make-up:

| Type | Monomers for the core | Monomers for the shell |
|---|---|---|
| I | Buta-1,3-diene, isoprene, n-butyl acrylate, ethylhexyl acrylate or mixtures thereof | Styrene, acrylonitrile, methyl methacrylate |
| II | as I but with concomitant use of crosslinkers | as I |

| Type | Monomers for the core | Monomers for the shell |
|---|---|---|
| III | as I or II | n-butyl acrylate, ethyl acrylate, methyl acrylate, buta-1,3-diene, isoprene, ethylhexyl acrylate |
| IV | as I or II | as I or III but with concomitant use of monomers having reactive groups, as described herein |
| V | Styrene, acrylonitrile, methyl methacrylate or mixtures thereof | First shell composed of monomers as described under I and II for the core Second shell as described under I or IV for the shell |

These graft polymers, in particular ABS and/or ASA polymers, in amounts of up to 40% by weight are preferably used for impact modifying PBT, optionally in admixture with up to 40% by weight of polyethylene terephthalate. Such blend products are obtainable under the trade name Ultradur®S (formerly Ultrablend®S from BASF AG).

Instead of graft polymers having a multishell structure, it is also possible to use homogeneous, i.e. single-shell, elastomers derived from buta-1,3-diene, isoprene and n-butyl acrylate or copolymers thereof. These products, too, can be produced by concomitant use of crosslinking monomers or monomers having reactive groups.

Examples of preferred emulsion polymers are n-butyl acrylate/(meth)acrylic acid copolymers, n-butyl acrylate/glycidyl acrylate copolymers or n-butyl acrylate/glycidyl methacrylate copolymers, graft polymers having an inner core composed of n-butyl acrylate or based on butadiene and an outer shell composed of the abovementioned copolymers and copolymers of ethylene with comonomers which provide reactive groups.

The elastomers described can also be prepared by other conventional processes, e.g. by suspension polymerization.

Silicone rubbers as described in DE-A 37 25 576, EP-A 235 690, DE-A 38 00 603 and EP-A 319 290 are likewise preferred.

It is of course also possible to use mixtures of the rubber types indicated above.

As component E, use is made of glass fibers. These can be conventional glass fibers which can be used as continuous fibers or chopped glass fibers. They can be uncoated or coated, for example coated with a silane size.

As component F, it is possible to use further auxiliaries which can be further additives or processing aids. Examples of suitable auxiliaries are mineral fillers such as talc, magnesium hydroxide, wollastonite needles, lubricants such as ester waxes and oxidized polyethylene waxes, stabilizers such as antioxidants, light stabilizers, phenols, phosphites and phosphonites or acid scavengers, nucleating agents, carbon blacks or pigments such as white pigments, for example $TiO_2$, ZnO, $ZrO_2$, $SnO_2$, ZnS.

The thermoplastic molding compositions comprise the abovementioned components A to F, insofar as these are present. The molding compositions can also consist of the abovementioned components, insofar as these are present.

The total amount of the components A to E (insofar as they are present) is 100% by weight.

Component A is used in an amount of from 5 to 99.9% by weight, preferably from 0.1 to 80% by weight, particularly preferably from 30 to 70% by weight, in particular from 50 to 65% by weight.

Component B is used in an amount of from 0.05 to 10% by weight, preferably from 0.05 to 5% by weight, particularly preferably from 0.1 to 2.5% by weight, in particular from 0.5 to 2% by weight.

Component C is used in an amount of from 0.1 to 50% by weight, preferably from 2 to 25% by weight, particularly preferably from 5 to 20% by weight, in particular from 8 to 20% by weight.

Component D is used in an amount of from 0 to 35% by weight, preferably from 0 to 15% by weight, particularly preferably from 0 to 10% by weight, in particular from 0 to 7% by weight.

When this component is present, the minimum amount is preferably 0.1% by weight, preferably at least 1% by weight, in particular at least 3% by weight.

Component E is used in an amount of from 0 to 60% by weight, preferably from 0 to 50% by weight, particularly preferably from 0 to 40% by weight, in particular from 0 to 30% by weight.

When the component E is present, the minimum amount is 1% by weight, preferably 5% by weight, particularly preferably 10% by weight, in particular 20% by weight.

The amount of component F is from 0 to 10% by weight, preferably from 0 to 7% by weight, particularly preferably from 0 to 5% by weight, in particular from 0 to 3% by weight. If component F is present, the minimum amount thereof is 0.1% by weight, preferably 0.5% by weight, particularly preferably 1% by weight.

The thermoplastic molding compositions of the invention can be produced according to known processes by mixing the starting components in conventional mixing apparatuses and subsequently extruding them. Suitable processing machines are described in: Handbuch der Kunststoffextrusion, Vol. 1 Grundlagen, edited by F. Hensen, W. Knappe, H. Potente, 1989, pages 3 to 7 (ISBN 3-446-14339-4) and in Vol. 2 Extrusionsanlagen, 1986 (ISBN 3-446-14329-7). After extrusion, the extrudate can be cooled and broken up. It is also possible to premix individual components and then add the remaining starting materials, either individually and/or likewise as a mixture, also as concentrates in a carrier polymer (masterbatch). The mixing temperatures are generally in the range from 230 to 320° C.

The invention is illustrated by the following examples.

EXAMPLES

Starting Materials

| | | |
|---|---|---|
| A | PA66 | VZ 120 cm³/g, Ultramid ®A24, from BASF SE |
| | Polyamide 6 | VZ 150 cm³/g, Ultramid ®B27, from BASF SE |
| | Polybutylene terephthalate | VZ 130 cm³/g, Ultradur ®B4500, from BASF SE |
| D | Glass fibers | OCF DS 1110 |
| | Glass fibers | PPG 3786 |
| C0 | Diethylphosphinate salt of aluminum (DEPAL) | e.g. Exolit © OP 1230 Clariant AG |
| C1 | Red phosphorus masterbatch, 52% P | Masteret ® from Italmatch Chemicals |
| C2 | Polypentabromobenzyl acrylate | FR1025 (ICL Industries) |
| C3 | Melamine polyphosphate (MPP) | Melapur ® M200, BASF Switzerland |
| D1 | Poly(2,6-dimethyl-1,4-phenylene oxide) | Sigma Aldrich |
| B | Mica-ZnO | Production as per trial A |
| B1 | Zinc oxide | Emsure ® from Merck KgaA |
| B2 | Mica-V2O5 | Production as per trial B |
| B3 | Zinc oxide | Bayoxid ®Z aktiv from Bayer AG |
| F | Calcium stearate | Ceasit AV |
| | N,N'-Hexamethylenebis[3-(3,5-di-t-butyl-4-hydroxyphenyl)propionamide | Irganox ®1098 from BASF SE |
| | Untreated mica | BASF SE |

Processing:

The processing of the molding compositions was carried out as indicated using a DSM Xplore 15 microcompounder. The extruder was operated at a temperature of 260-280° C. The rotational speed of the twin screws was 80 rpm. The residence time of the polymers after charging of the extruder was 3 min. To produce moldings, the polymer melt was transferred by means of a heated melt vessel into the injection-molding machine Xplore Micro-Injection Molding Machine 10 cc and immediately injected into the mold. A tool temperature of 60° C. was employed. Injection molding was carried out in three stages of 16 bar for 5 s, 16 bar for 5 s and 16 bar for 4 s. Shoulder bars in accordance with ISO527-2/1BA/2 were produced in three stages of 14 bar for 5 s, 14 bar for 5 s and 14 bar for 4 s.

As an alternative, the individual components were for this purpose mixed in a twin-screw extruder (ZSK 18 or ZSK 25) at a throughput of 20 kg/h and about 260° C. (PBT, PA6) or 280° C. (PA66) with a flat temperature profile, discharged as extrudate, cooled until pelletizable and pelletized. The test specimens for the studies indicated in the tables were injection-molded on an Arburg 420 injection-molding machine at a melt temperature of about 260-280° C. and a tool temperature of about 80° C.

The constitutions of the molding compositions and the results of the measurements are shown in the tables.

Testing:

The mechanical properties were determined in accordance with ISO 527-2/1A/5 and the Charpy impact toughness (unnotched) was determined in accordance with ISO 179-2/1eU.

The flame resistance of the molding compositions was determined firstly by the method UL94-V (Underwriters Laboratories Inc. Standard of Safety, "Test for Flammability of Plastic Materials for Parts in Devices and Appliances", p. 14 to p. 18 Northbrook 1998). In the case of the formulations produced using the DSM Xplore 15 microcompounder, an abbreviated method was employed. Two test bars were in each case tested according to the procedure prescribed for the UL94V test. The sum of the burning times is reported as average of the times for the two test specimens. The corresponding examples are marked.

The determination of the flue gas density, heat liberation and residue after combustion was carried out in accordance with ISO 5660-1: 2002. All plates had a thickness of 4 mm. Testing was carried out using a heating radiator power of 50 kW m$^{-2}$.

Trial a

Production of Mica Having a Zinc Oxide Coating 69 g of an aqueous paste comprising 50 g of mica (G1, G2 or G3) were dissolved in 930 ml of water. 40 g of potassium carbonate were added to this suspension. The suspension was heated to 60° C. L1 was then introduced over a period of 8 hours in such an amount that the mass ratios indicated in the table below were established. Here, the pH was kept constant at pH=10 by means of potassium carbonate solution. After the addition was complete, the suspension was cooled and the solid was separated from the mother liquor by filtration. The solid was washed with deionized water until the conductivity had dropped below 200 μS. The filter cake was firstly dried at 110° C. in a convection oven and calcined in a porcelain dish at temperatures in the range from 800° C. to 1000° C. in a muffle furnace for 1 hour.

As an alternative, the material can be produced as follows:

110 g of an aqueous paste comprising 80 g of mica (G1, G2 or G3) were dissolved in 930 ml of water. 50 g of potassium carbonate were added to this suspension. The suspension was heated to 60° C. L2 was then added over a period of 8 hours in such an amount that the mass ratios indicated in the table below were established. Here, the pH was kept constant at a pH in the range from 9.5 to 10.5 by means of potassium carbonate solution. After the addition was complete, the suspension was cooled and the solid was separated from the mother liquor by filtration. The solid was washed with deionized water until the conductivity had dropped below 200 μS. The filter cake was firstly dried at 110° C. in a convection oven and calcined in a porcelain dish at temperatures in the range from 800° C. to 1000° C. in a muffle furnace for 1 hour.

L1: 150 g of Zn(NO3)2*6H2O were dissolved in 700 ml and the solution was made up to 1000 ml with water.

L2: 240 g of Zn(NO3)2*6H2O were dissolved in 700 ml and the solution was made up to 1000 ml with water.

Mica:

G1: Natural mica having a particle size d50 determined by light scattering (Malvern 3000) d50=31.9 μm.

G2: Natural mica having a particle size d50 determined by light scattering (Malvern 3000) d50=17.1 μm.

G3: Natural mica having a particle size d50 determined by light scattering (Malvern 3000) d50=9.89 um.

| Product | Mass ratio of ZnO/mica (g/g) | ZnO in % by weight | Mica | Calcination temperature (° C.) |
|---|---|---|---|---|
| Mica ZnO 1 | 33 g ZnO/100 g mica | 25 | G1 | 800 |
| Mica ZnO 2 | 52 g ZnO/80 g mica | 40 | G1 | 1000 |
| Mica ZnO 3 | 52 g ZnO/80 g mica | 40 | G2 | 1000 |
| Mica ZnO 4 | 52 g ZnO/80 g mica | 40 | G3 | 1000 |
| Mica ZnO 5 | 33 g ZnO/100 g mica | 25 | G3 | 800 |
| MICA ZnO 6 | 33 g ZnO/100 g mica | 25 | G3 | 800 |
| MICA ZnO 7 | 50 g ZnO/100 g Mica | 33 | G3 | 1000 |

Heat Treatment:

Metal oxide layers produced by wet precipitation typically have numerous hydroxyl groups and/or carbonate groups. To improve the stability, the condensation in the production process was preferably carried out to complete conversion, so that water was no longer released during later processing of the materials, for instance during extrusion of polymers at high temperatures. Completion of the conversion in the condensation of the oxide layers was generally brought about by drying in hot air.

Production of Mica Having a Vanadium Oxide Coating 75 g of mica were introduced into 450 ml of water, and 400 ml of 5% nitric acid were added. 27.28 g of vanadium (IV) sulfate hydrate were added to this suspension and a temperature of 80° C. was set. Neutralization was carried out by addition of 5% NaOH at a rate of 100 ml/h. After the addition was complete, the suspension was cooled and the solid was separated from the mother liquor by filtration. The solid was washed with at least 500 ml of deionized water and subsequently washed with ethanol. The filter cake was firstly dried at 110° C. in a convection oven and calcined in a porcelain dish at temperatures in the range from 500° C. to 800° C. in a muffle furnace for 1 hour.

Example 1

TABLE 1

Extrusion by means of ZSK18.

| Sample | Comp1 | 2 | 3 | 4 | Comp5 | Comp6 | Comp7 |
|---|---|---|---|---|---|---|---|
| Ultramid A24 | 65 | 60.15 | 64.15 | 60.15 | 64.15 | 60.15 | 61 |
| DS1110 (PA GF) | 25 | 25 | 25 | 25 | 25 | 25 | 25 |
| DEPAL C0 | 10 | 10 | 10 | 10 | 10 | 10 | 10 |
| Melapur M200 C3 | 0 | 4 | 0 | 4 | 0 | 4 | 4 |
| Mica ZnO 1 | 0 | 0.85 | 0 | 0 | 0 | 0 | 0 |
| Mica ZnO 2 | 0 | 0 | 0.85 | 0.85 | 0 | 0 | 0 |
| Zinc oxide B1 | 0 | 0 | 0 | 0 | 0.85 | 0.85 | 0 |

The use of small amounts of zinc oxide/mica significantly improves the flame resistance. No improvement can be achieved by means of standard ZnO.

TABLE 2

Testing in accordance with UL94 to 0.8 mm.

| Sample | Comp1 | 2 | 3 | 4 | Comp5 | Comp6 | Comp7 |
|---|---|---|---|---|---|---|---|
| Classification | V-2 | V-0 | V-1 | V-0 | V-2 | V-2 | V-2 |
| Total burning time [s] | 135 | 38 | 115 | 42 | 121 | 83 | 56 |
| Absorbent cotton at the bottom ignites | yes | no | no | no | yes | yes | yes |

Samples Comp1 and Comp5-Comp7 display significant dripping and ignition of the absorbent cotton at the bottom. Samples 2, 3 and 4 comprising the specially prepared zinc oxide/mica show significantly less dripping due to carbonization and in each case V1 or even V0 behavior. The trial clearly shows that the form in which the zinc oxide is added is important.

Example 2

TABLE 3

Extrusion by means of ZSK25.

| Sample | Comp1 | 2 |
|---|---|---|
| Ultramid A27 | 60.4 | 60.2 |
| OCF DS1110-10N (PA GF) | 26 | 26 |
| Red phosphorus masterbatch C1 | 12 | 12 |
| Zinc oxide B3 | 0.7 | 0 |
| Calcium stearate (Ceasit AV) | 0.55 | 0.55 |
| Irganox 1098 | 0.35 | 0.35 |
| Mica ZnO 3 | | 0.9 |

Zinc oxide/mica displays better flame resistance than the previous formulation. The actual amount of zinc oxide is lower in the case of the coated mica flakes than in the comparative example.

TABLE 4

Testing in accordance with UL94 to 0.8 mm.

| Sample | Comp1 | 2 |
|---|---|---|
| Classification | V-1 | V-0 |
| Total burning time [s] | 51 | 35 |
| Absorbent cotton at the bottom ignites | no | no |
| Burning of the holder | no | no |

TABLE 5

Testing in accordance with ISO 5660-1. A heating radiator power of 50 kW $m^{-2}$ was used.

| Sample | Comp1 | 2 |
|---|---|---|
| Ignition time [s] | 42 ± 1 | 44 ± 1 |
| Total quantity of heat liberated [MJ $m^{-2}$] | 133 ± 6 | 115 ± 2 |
| MARHE [kW $m^{-2}$] | 104 ± 3 | 96 ± 3 |
| Flue gas density [$m^2$] | 27 ± 3 | 26 ± 2 |
| Mass of residue [%] | 37 ± 1 | 40 ± 1 |

Example 3

TABLE 5

Extrusion by means of ZSK18.

| Sample | Comp1 | 3 | Comp4 |
|---|---|---|---|
| Ultramid A24 | 65.0 | 64.0 | 64.0 |
| DS1110 (PA GF) | 25.0 | 25.0 | 25.0 |
| Red phosphorus masterbatch C1 | 10.0 | 10.0 | 10.0 |
| MICA ZnO 4 | 0.0 | 1.0 | 0.0 |
| Zinc oxide B1 | 0.0 | 0.0 | 1.0 |

Here, a reduced amount of red phosphorus was used. The control sample having this amount of phosphorus did not achieve any classification. Use of mica/ZnO enables a V-1 classification to be achieved.

TABLE 6

Testing in accordance with UL94 to 1.6 mm.

| Sample | Comp1 | 3 | Comp4 |
|---|---|---|---|
| Classification | V- | V-1 | V-2 |
| Total burning time [s] | 75 | 39 | 161 |
| Absorbent cotton at the bottom ignites | yes | no | yes |
| Burning of the holder | yes | no | no |

Example 4

TABLE 7

Extrusion by means of ZSK18.

| Sample | Comp1 | 2 | 3 | 4 | 5 | Comp6 |
|---|---|---|---|---|---|---|
| Ultramid B27 | 57.0 | 56.0 | 56.0 | 56.0 | 56.0 | 56.0 |
| DS1110 (PA GF) | 25.0 | 25.0 | 25.0 | 25.0 | 25.0 | 25.0 |
| DEPAL C0 | 12.0 | 12.0 | 12.0 | 12.0 | 12.0 | 12.0 |
| Melapur M200 C3 | 6.0 | 6.0 | 6.0 | 6.0 | 6.0 | 6.0 |
| MICA ZnO 5 | 0.0 | 1.0 | 0.0 | 0.0 | 0.0 | 0.0 |
| MICA ZnO 4 | 0.0 | 0.0 | 1.0 | 0.0 | 0.0 | 0.0 |
| MICA ZnO 6 | 0.0 | 0.0 | 0.0 | 1.0 | 0.0 | 0.0 |
| MICA ZnO 7 | 0.0 | 0.0 | 0.0 | 0.0 | 1.0 | 0.0 |
| Zinc oxide B1 | 0.0 | 0.0 | 0.0 | 0.0 | 0.0 | 1.0 |

The use of small amounts of zinc oxide/mica significantly improves the flame resistance of PA6. Only a small improvement can be achieved by means of standard ZnO. Various types of mica-ZnO fulfill the purpose.

TABLE 8

Testing in accordance with UL94 to 0.8 mm.

| Sample | Comp1 | 2 | 3 | 4 | 5 | Comp6 |
|---|---|---|---|---|---|---|
| Classification | V-2 | V-0 | V-0 | V-0 | V-0 | V-1 |
| Total burning time [s] | 35 | 28 | 39 | 34 | 31 | 54 |
| Absorbent cotton at the bottom ignites | yes | no | no | no | no | no |

Example 5

TABLE 9

Extrusion by means of DSM miniextruder

| Sample | Comp1 | 2 | 3 | Comp4 | 5 | 6 | Comp7 | Comp8 | Comp9 |
|---|---|---|---|---|---|---|---|---|---|
| Ultradur B4500 | 64.5 | 64.5 | 62.5 | 63.0 | 62.0 | 61.0 | 61.0 | 63.5 | 62.5 |
| Glass fibers | 25.0 | 25.0 | 25.0 | 25.0 | 25.0 | 25.0 | 25.0 | 25.0 | 25.0 |
| DEPAL C0 | 8.0 | 8.0 | 8.0 | 8.0 | 8.0 | 8.0 | 8.0 | 8.0 | 8.0 |
| MPP | 2.5 | 2.5 | 2.5 | 4.0 | 4.0 | 4.0 | 4.0 | 2.5 | 2.5 |
| Mica + V2O5, 500° C. | 0.0 | 0.0 | 0.0 | 0.0 | 1.0 | 2.0 | 0.0 | 0.0 | 0.0 |
| Mica + V2O5, 800° C. | 0.0 | 1.0 | 2.0 | 0.0 | 0.0 | 0.0 | 0.0 | 0.0 | 0.0 |
| Mica untreated | 0.0 | 0.0 | 0.0 | 0.0 | 0.0 | 0.0 | 2.0 | 1.0 | 2.0 |

The use of small amounts of vanadium oxide/mica significantly improves the flame resistance of PBT comprising a phosphorous-comprising flame retardant.

TABLE 10

Testing according to the method of UL94 to 1.6 mm. Only 2 burning bars were tested in each case.

| Sample | Comp1 | 2 | 3 | Comp4 | 5 | 6 | Comp7 | Comp8 | Comp9 |
|---|---|---|---|---|---|---|---|---|---|
| Classification | V2 | V1 | V1 | V2 | V1 | V0 | V- | V- | V2 |
| Total burning time t1 + t2 [s] | 21 | 29 | 26 | 31 | 22 | 6 | 66 | >30 | 25 |
| Absorbent cotton at the bottom ignites | yes | no | no | yes | no | no | no | yes | yes |

Example 6

TABLE 11

| Extrusion by means of DSM miniextruder | | | | | |
|---|---|---|---|---|---|
| Sample | 1 | 2 | Comp3 | Comp4 | Comp5 |
| Ultradur B4500 | 52.10 | 51.10 | 53.10 | 52.10 | 51.10 |
| Glass fibers PPG3786 (PBT standard) | 25.00 | 25.00 | 25.00 | 25.00 | 25.00 |
| Poly(2,6-dimethyl-1,4-phenylene oxide) | 5.00 | 5.00 | 5.00 | 5.00 | 5.00 |
| Brominated acrylate FR1025 | 16.90 | 16.90 | 16.90 | 16.90 | 16.90 |
| Vanadium oxide-MICA (800° C.) GM0948-0136 | 1.00 | 2.00 | 0.00 | 0.00 | 0.00 |
| Mica untreated | 0.00 | 0.00 | 0.00 | 1.00 | 2.00 |

The use of small amounts of vanadium oxide/mica significantly improves the flame resistance of PBT comprising a halogenated flame retardant.

TABLE 12

Testing according to the method of UL94 to 1.6 mm. Only 2 burning bars were tested in each case.

| Sample | 1 | 2 | Comp3 | Comp4 | Comp5 |
|---|---|---|---|---|---|
| Classification | V0 | V0 | V2 | V1 | V1 |
| Total burning time t1 + t2 [s] | 9 | 5 | 21 | 12 | 17 |
| Absorbent cotton at the bottom ignites | no | no | yes | no | no |

The invention claimed is:

1. A thermoplastic molding composition comprising:
   a) from 30 to 90% by weight of at least one thermoplastic polymer as component A, wherein component A is at least one polyamide and/or polyester,
   b) from 0.5 to 10% by weight of at least one mica coated with a metal oxide as component B, wherein the metal oxide coated on the at least one mica increases fire resistance of the thermoplastic molding composition as a flame retardant is present in an amount from 5 to 80% by weight relative to the mica and comprises (i) at least one of ZnO and $V_2O_5$, and (ii) not more than 20% by weight, based on the total amount of mica in the coating, of further metal oxides other than ZnO or $V_2O_5$,
   c) from 2 to 25% by weight of at least one flame retardant different from component B as component C,
   d) from 0 to 35% by weight of at least one functional polymer different from component A as component D,
   e) from 1 to 60% by weight of glass fibers as component E, and
   f) from 0 to 10% by weight of further auxiliaries as component F,
   wherein:
      the total amount of the components A to E is 100% by weight.

2. The thermoplastic molding composition according to claim 1, wherein component C is a phosphinic acid salt, a halogen-comprising flame retardant, phosphorus, a melamine compound, or a mixture of two or more thereof.

3. The thermoplastic molding composition according to claim 1, wherein component C is selected from the group consisting of
   c1) aluminum diethylphosphinate and/or aluminum hypophosphite,
   c2) aluminum diethylphosphinate and/or aluminum phosphite in combination with at least one melamine compound,
   c3) red phosphorus, and
   c4) polypentabromobenzyl acrylate.

4. The thermoplastic molding composition according to claim 1, wherein component D is present in an amount of 0.1 to 35% by weight and is poly(2,6-dimethyl-1,4-phenylene oxide).

5. The thermoplastic molding composition according to claim 1, wherein the coating is free from metal oxides other than ZnO or $V_2O_5$.

6. The thermoplastic molding composition according to claim 1, wherein the metal oxide coated on the at least one mica comprises: (i) ZnO, and (ii) not more than 10% by weight, based on the total amount of mica in the coating, of further metal oxides other than ZnO or $V_2O_5$.

7. The thermoplastic molding composition according to claim 1, wherein:
   the metal oxide coated on the at least one mica comprises: (i) $V_2O_5$, and (ii) not more than 10% by weight, based on the total amount of mica in the coating, of further metal oxides other than ZnO or $V_2O_5$.

8. The thermoplastic molding composition according to claim 1, wherein the at least one thermoplastic polymer as component A is polybutylene terephthalate.

9. The thermoplastic molding composition according to claim 1, wherein the at least one thermoplastic polymer as component A is at least one polyimide.

10. The thermoplastic molding composition according to claim 1, wherein the thermoplastic molding composition comprises from 30 to 70% by weight of the at least one thermoplastic polymer as component A.

11. The thermoplastic molding composition according to claim 10, wherein the metal oxide coated on the at least one mica comprises $V_2O_5$.

12. The thermoplastic molding composition according to claim 1, wherein:
   the metal oxide coated on the at least one mica comprises: (i) $V_2O_5$, and (ii) not more than 10% by weight, based on the total amount of mica in the coating, of further metal oxides other than ZnO or $V_2O_5$; and
   the at least one thermoplastic polymer as component A is at least one polyamide.

13. The thermoplastic molding composition according to claim 1, wherein the metal oxide coated on the at least one mica in component B is present in an amount from 20 to 50% by weight relative to the mica.

14. The thermoplastic molding composition according to claim 1, wherein:
   component A is present in an amount from 30 to 70% by weight;
   component B is present in an amount from 0.5 to 5% by weight;
   component C is present in an amount from 2 to 25% 5 to 20% by weight; and
   component E is present in an amount from 5 to 50% by weight.

15. The thermoplastic molding composition according to claim 1, wherein:
   component A is present in an amount from 50 to 65% by weight;
   component B is present in an amount from 0.5 to 2% by weight;
   component C is present in an amount from 5 to 20% 8 to 20% by weight; and
   component E is present in an amount from 10 to 40% by weight.

16. A process for producing thermoplastic molding compositions according to claim 1 by mixing the constituents.

17. A molding, fiber, or film comprising a thermoplastic molding composition according to claim 1.

18. A process for producing moldings, fibers, or films comprising melting, extruding, and subsequent shaping of a thermoplastic molding composition according to claim 1.

* * * * *